US008153165B2

(12) United States Patent
Ritter

(10) Patent No.: US 8,153,165 B2
(45) Date of Patent: *Apr. 10, 2012

(54) PREPARATION AND USE FOR REDUCING THE DAMAGING EFFECT OF AMMONIA ON ORGANISMS LIVING IN WATER

(75) Inventor: Günter Ritter, Bunde (DE)

(73) Assignee: Tetra GmbH, Melle (DE)

( * ) Notice: Subject to any disclaimer, the term of this patent is extended or adjusted under 35 U.S.C. 154(b) by 1149 days.

This patent is subject to a terminal disclaimer.

(21) Appl. No.: 11/858,265

(22) Filed: Sep. 20, 2007

(65) Prior Publication Data

US 2008/0089955 A1   Apr. 17, 2008

(30) Foreign Application Priority Data

Sep. 22, 2006  (DE) .......................... 10 2006 045 333

(51) Int. Cl.
*A01N 59/02* (2006.01)
*A01N 37/00* (2006.01)
*A01N 37/02* (2006.01)
*A01N 37/36* (2006.01)
*A01N 35/02* (2006.01)
*A01N 41/04* (2006.01)
*C02F 1/68* (2006.01)

(52) U.S. Cl. ........ 424/711; 514/553; 514/557; 514/578; 514/702; 514/711; 210/749

(58) Field of Classification Search .................. 424/711; 514/711, 553, 557, 578, 702; 210/749
See application file for complete search history.

(56) References Cited

U.S. PATENT DOCUMENTS

| | | | |
|---|---|---|---|
| 2,861,040 A | 11/1958 | Buchanan | |
| 3,743,504 A | 7/1973 | Dappen | |
| 3,865,787 A | 2/1975 | Ludwig | |
| 4,257,899 A | 3/1981 | Orvik | |
| 4,278,433 A | 7/1981 | Blum | |
| 4,364,835 A | 12/1982 | Cheh | |
| 4,666,610 A | 5/1987 | Kuhns | |
| 4,786,434 A | 11/1988 | Günter | |
| 5,082,573 A | 1/1992 | Goldstein | |
| 5,139,929 A | 8/1992 | Ishikawa | |
| 5,545,684 A | 8/1996 | Jakob | |
| 5,807,587 A * | 9/1998 | Cox et al. ..................... | 424/76.6 |
| 5,869,073 A | 2/1999 | Sawan | |
| 7,008,545 B2 | 3/2006 | Cronan, Jr. | |
| 2003/0029811 A1 | 2/2003 | Russell | |
| 2008/0073291 A1 | 3/2008 | Ritter | |

FOREIGN PATENT DOCUMENTS

| | | |
|---|---|---|
| DE | 600383 | 7/1934 |
| DE | 446662 | 4/1936 |
| DE | 940875 | 3/1956 |
| DE | 2916673 B1 | 10/1980 |
| DE | 3704295 C1 | 2/1987 |
| DE | 263449 A1 | 1/1989 |
| DE | 4420484 | 12/1995 |
| EP | 0203741 | 12/1986 |
| EP | 0270382 | 6/1988 |
| EP | 0 278 515 B1 | 6/1991 |
| GB | 19722 | 0/1915 |
| WO | WO02072478 A2 | 9/2002 |
| WO | WO2005047194 A1 | 5/2005 |

OTHER PUBLICATIONS

AmQuel literature, "AmQuel-How It Works," 1998; obtained from USPTO files. Original obtained on Nov. 8, 2002 from the Internet<http://www.novalek.com/kpd58.htm>.*
Frank et al., J. Am. Chem. Soc., 118 :11321-11322, 1996.
NIST CSTL Abstract for Acetaldehyde, hydroxy-, 2008, http://webbook.nist.gov/cgi/cbook.cgi?Name=glycolic+aldehyde&Units=SI.
Office Action mailed Aug. 4, 2008 in co-pending U.S. Appl. No. 11/857,638.
Final Rejection mailed Jan. 12, 2009 in co-pending U.S. Appl. No. 11/857,638.
Advisory Action mailed Mar. 13, 2009 in co-pending U.S. Appl. No. 11/857,638.
Office Action mailed Jun. 8, 2009 in co-pending U.S. Appl. No. 11/857,638.
Final Rejection mailed Dec. 9, 2009 in co-pending U.S. Appl. No. 11/857,638.
Office Action mailed Sep. 30, 2010 in co-pending U.S. Appl. No. 11/857,638.
Final Rejection mailed May 20, 2011 in co-pending U.S. Appl. No. 11/857,638.
U.S. Appl. No. 11/857,638 pending claims filed Jun. 9, 2010.
German Search Report dated completed Aug. 29, 2007 in the corresponding German Application No. 102006045332.8 (*in German*).
Partial Search Report dated Jan. 1, 2008 in co-pending European Patent Application No. 07018612.7 (*in German*).
European Search Report and Search Opinion dated Apr. 10, 2008 in co-pending European Patent Application No. 07018612.7 (*in German*).
EPO Communication dated Dec. 10, 2008 in co-pending European Patent Application No. 07018612.7 (*in German*).

* cited by examiner

*Primary Examiner* — John Pak
(74) *Attorney, Agent, or Firm* — Merchant & Gould, PC

(57) ABSTRACT

The invention describes novel preparations and their use for reducing the acute damaging effect of ammonia in organisms living in the keeping water of aquariums, garden ponds, or aquaculture systems. The preparations consist of adducts of sodium hydrogen sulfite at an aliphatic aldehyde of the general formula

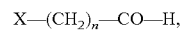

X—(CH$_2$)$_n$—CO—H, wherein
n means the numbers 0 to 3, and
X means an —OH, —COOH, or —CO—H group,
wherein X cannot be —OH, if n=0. The preparations are used in the keeping water with a concentration of 10 to 140 mg/l.

19 Claims, No Drawings

PREPARATION AND USE FOR REDUCING THE DAMAGING EFFECT OF AMMONIA ON ORGANISMS LIVING IN WATER

BACKGROUND OF THE INVENTION

The invention describes novel preparations and their use for reducing the acute damaging effect of ammonia on organisms living in the keeping water of aquariums, garden ponds, or aquaculture systems.

SUMMARY OF THE INVENTION

In natural and artificial systems containing fish and other water organisms, ammonia is permanently released from natural processes, like the decomposition and metabolization of proteins, of nitrogen excretion from fish as $NH_4^+$ or $NH_3$, respectively.

The distribution of total ammonia (ammonia ions, $NH_4^+$, as well as free ammonia, $NH_3$) into the two species mainly depends on the pH of the water and follows the law of mass action for the acid-base system $NH_4^+$—$NH_3$. The acutely toxic effect is attributed to the free ammonia ($NH_3$).

With an increasing concentration of total ammonia and an increasing pH value grows the percentage of $NH_3$, the solely toxically or damagingly, respectively, acting uncharged form of total ammonia. In biologically active systems, the concentration of total ammonia, and thus also of ammonia itself, is normally lowered to very low concentrations of <0.5 mg/l of total ammonia by nitrifying bacteria, the so-called ammonia oxidizers. In case of disturbances of the ammonia oxidation or in a freshly set up, still sterile keeping system, an accumulation of ammonia up to high, and then damaging concentrations of $NH_3$ is possible, since no microorganisms exist, which can effect a decomposition to nitrates and finally nitrogen.

Various preparations and methods are known, how to lower excessive $NH_3$ concentrations to harmless concentration ranges:

1. Stripping Method

Aeration of the water, and thus expulsion of the volatile $NH_3$ gas.

This process takes days to weeks, requires higher pH values, and is therefore unsuitable to solve problems of acute ammonia toxicity quickly.

2. Covalent Chemical Bonding of $NH_3$

So far, methods allowing for covalent bonding of the ammonia by addition of organic reaction partners for $NH_3$ concentration ranges common in keeping water are unknown.

In the EP patent EP 0 278 515 (B1), the use of sodium hydroxymethanesulfonate for $NH_3$ reduction via a chemical reaction with covalent incorporation of $NH_3$ is described. However, scientific investigations showed, that such a reaction does not take place under the circumstances described above. Neither a reduction in the ammonia concentration nor a, however disposed, reduction of the $NH_3$ toxicity could be observed.

3. Addition of Acids

Following the addition of inorganic or organic acids to the $NH_3$-containing keeping water, the pH value is lowered, and the $NH_3/NH_4^+$ acid-base equilibrium is shifted towards the non-toxic ammonia ion. Since the pH reduction results via a release of $CO_2$ from the reaction of added acid with present $HCO_3^-$, the $NH_3$-lowering effect, however, only is short-lived (<12 h), because the released $CO_2$ quickly escapes into the atmosphere. The $NH_3/NH_4^+$ equilibrium can also be shifted towards $NH_4^+$ by addition of organic ammonia salts as weak acids. But here too, the effect achieved is only short-lived.

To render free ammonia harmless with conventional means, it is therefore necessary to re-dose the respective preparation on a daily basis, and to permanently check the ammonia content, for example in an aquarium.

It is therefore the object of the invention to find a preparation and method, that effects that the ammonia content remains in a secure range over a longer period of time, so that only an initial dose is required for this at first, which then does not have to be repeated for at least 3 to 5 days.

The preparations described in the invention have not been used for this purpose yet, and offer substantial advantages compared to state of the art preparations and methods.

Namely, it was found, that adducts of sodium hydrogen sulfite to an aliphatic aldehyde with the general formula

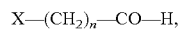

$$X-(CH_2)_n-CO-H,$$

wherein
n means the numbers 0 to 3, and
X means an —OH, —COOH, or —CO—H group,
wherein X cannot be —OH, if n=0,
are excellent preparations for lowering the damaging effect of ammonia to water organisms.

This, for example, includes adducts with glycerinaldehyde or glyoxylic acid.

Bisadducts of the dialdehydes glyoxal and glutardialdehyde with $NaHSO_3$ have proved to be especially effective. But also bisadducts of $NaHSO_3$ with other dialdehydes, like for example malondialdehyde or succindialdehyde and $NaHSO_3$ monoadducts of glycolaldehyde show the desired reduction of the acute toxicity of ammonia in water animals, in particular ornamental fish.

Since the preferred $NaHSO_3$ bisadducts of glyoxal and glutardialdehyde were investigated with special intensity, the advantages and results of the practical tests described in the following essentially refer to these two compounds. Among the $NaHSO_3$ bisadducts of glyoxal and glutardialdehyde, the adduct of glyoxal is especially preferred.

At this point of time, however, the tests reveal nothing about the special characteristics and relative qualities of other adducts yet.

Test with the $NaHSO_3$ Bisadduct of Glyoxal

On addition of 5-140 mg/l, preferably 10-50 mg/l of 2 $Na^+[O_3S(HO)CHCH(OH)SO_3]$, the acute toxicity of ammonia to fish was clearly reduced under the given test conditions. The adduct alone is very well compatible for fish and other water organisms up to high concentrations of 140 mg/l. In an extended pH range between pH 3 and 9, the liquid product formulations show good stability. In that, it showed that an excess of $NaHSO_3$ of 5-10 mol % has a favorable effect on the stability of the adducts.

The $NaHSO_3$ adducts with the aldehydes stated above can be easily produced from an $NaHSO_3$ solution and the respective aldehydes, either in the form of a solution or as a solid, which can be easily purified, since its solubility in excess of a 38-40% $NaHSO_3$ solution is low. Should the product solution contain more $NaHSO_3$-aldehyde adduct than can be dissolved, then the adduct precipitated from the reaction mixture accrues as a very fine-grained suspension, and can thus be separated and used directly, if applicable.

The compounds stated can be applied alone or in combination. With a one-time metered addition of the required amount of adduct, for example 10-150 mg/l, to the keeping water, the acute toxicity of $NH_3$ is significantly lowered over 3-4 days. Repeating the dosage every 72 hours, $NH_3$-detoxicating effects can be achieved over a period of 10-14 days with 3-4 single doses.

Test Performance

In aquariums holding 50 liters, the aquarium water was set to the following values:

| | |
|---|---|
| Temperature | 25° C. |
| Carbonate hardness | 5° dH |
| pH | 8.2 |

Metered addition of a $NH_4Cl$ solution set to pH 8.2 predetermined a total ammonia concentration of 1000 μmol/l.

The aquariums were stocked with types of fish common in aquariums:
Xiphosphorus maculatus
Brachydanio rerio
Paracheirodon innesi
Rasbora heteromorpha
Colisa lalia
Papiliochromis ramirezi
Melanochromis splendida
Megalamphodus sweglesi
Corydoras spec Most fish in the aquariums with 1000 μmol/l of total ammonia added immediately showed clear damages, intoxication and stress symptoms. Only about 30% of the test fish behaved normal. Following addition of the preparation according to the invention, $NaHSO_3$ bisadduct of glyoxal (=glyoxal.$2NaHSO_3$), the majority of the test fish behaved normal and showed no signs of damage by ammonia. The percentage of fish behaving normally increased with a growing dose of glyoxal.$2NaHSO_3$. The behavioral pattern observed persisted over 48-72 h, i.e. 2-3 days.

In the following tables, the average values of the behavior of all types of fish are represented averaged depending on the time and dose of glyoxal.$2NaHSO_3$: (Comparison: control with 1000 μmol/l of total ammonia without treatment)

TABLE A

Dose of glyoxal•$2NaHSO_3$: 35 mg/l

| | Normal behavior show % of the test fish | |
|---|---|---|
| | Control | Plus glyoxal•$2NaHSO_3$ |
| 0 hrs (before dose) | 100 | 89 |
| 2 hrs | 44 | 67 |
| 5 hrs | 11 | 67 |
| 9 hrs | 22 | 67 |
| 23 hrs | 22 | 56 |
| 29 hrs | 11 | 67 |
| 46 hrs | 22 | 67 |
| 54 hrs | 44 | 56 |
| 72 hrs | 33 | 44 |

TABLE B

Dose of glyoxal•$2NaHSO_3$: 130 mg/l

| | Normal behavior show % of the test fish | |
|---|---|---|
| | Control | Plus glyoxal•$2NaHSO_3$ |
| 0 hrs (before dose) | 89 | 100 |
| 2 hrs | 33 | 78 |
| 4 hrs | 22 | 78 |
| 8 hrs | 11 | 78 |
| 24 hrs | 33 | 78 |
| 48 hrs | 22 | 100 |

The results show, also in Table A, that during the first 48 hours, a significantly higher percentage of the test fish shows normal behavior than in the control test without treatment. For doses of glyoxal.$2NaHSO_3$ between the two values of 35 mg/l and 130 mg/l, the results (in % of normal behavior) likewise lie between the concentrations stated above.

Still better results are achieved, if the dose of glyoxal.$2NaHSO_3$ is repeated every 72 hours up to three or four times in succession. The results are summarized in Table C.

It shows, that with the multiple dose respectively administered after three days, it is possible to neutralize the damaging or toxic effects of high ammonia concentrations between 70 and 100%, i.e. almost completely.

The preparations according to the invention, in particular glyoxal.$2NaHSO_3$, were also checked in comparison to important state of the art products and proved their advantageous, superior effect in the comparative tests.

TABLE C

Three-time dose of glyoxal•$2NaHSO_3$ (35 mg/l) every 72 hours

| | Normal behavior show % of the test fish | |
|---|---|---|
| | Control | Plus glyoxal•$2NaHSO_3$ |
| 0 hrs (before doses) | 89 | 100 |
| 2 hrs | 44 | 78 |
| 4 hrs | 22 | 78 |
| 5 hrs | 11 | 78 |
| 24 hrs | 22 | 67 |
| 72 hrs (before $2^{nd}$ dose) | 22 | 78 |
| 74 hrs | 11 | 67 |
| 96 hrs | 11 | 89 |
| 120 hrs | 22 | 89 |
| 144 hrs (before $3^{rd}$ dose) | 22 | 89 |
| 145 hrs | 33 | 100 |
| 168 hrs | 22 | 89 |
| 192 hrs | 11 | 100 |
| 5 days after the $3^{rd}$ dose (i.e. 11 days) | 33 | 89 |

TABLE D

Comparison of glyoxal•2NaHSO₃ (35 mg/l) with important state of the art products

| | | | Normal behavior show % of the test fish | | |
|---|---|---|---|---|---|
| | Control | Glyoxal•2NaHSO₃ | Product A Ammonia salt | Product B Active agent unknown | Product C HO—CH₂⁻SO₃⁻Na⁺ |
| 0 hrs (before dose) | 100 | 89 | 89 | 100 | 89 |
| 2 hrs | 44 | 67 | 67 | 78 | 44 |
| 5 hrs | 11 | 67 | 67 | 67 | 33 |
| 8.5 hrs | 22 | 67 | 33 | 22 | 22 |
| 22.5 hrs | 22 | 56 | 33 | 33 | 11 |
| 29 hrs | 11 | 67 | 0 | 11 | 22 |
| 46 hrs | 22 | 67 | 33 | 11 | 33 |
| 54 hrs | 44 | 56 | 44 | 33 | 56 |
| 72 hrs | 33 | 44 | 33 | 22 | 22 |

Until today, it is not exactly known yet, how the superior and advantageous effect of glyoxal.2NaHSO₃ and the other aldehyde-NaHSO₃ adducts according to the invention is accomplished. The positive effect may originate from the preparation itself, wherein, for example glyoxal.2NaHSO₃ acts as a protecting agent in the gill area. The second possibility is an indirect effect by influencing the water chemistry, which again results in a shift of the $NH_3/NH_4^+$ equilibrium. Glyoxal-2NaHSO₃ causes two different chemical changes in the keeping water:

1. pH reduction by up to 0.5 units, which persists considerably longer than with state of the art preparations and products, for example a reduction by 0.3 pH units up to 72 hours following the dose.

Other state of the art active agents either do not cause this clear pH reduction or the pH reduction caused lasts only about 8-12 hours, for example on addition of mineral acid to the keeping water.

2. Reduction of the carbonate hardness up to 0.5-0.60dH, wherein the carbonate hardness reduction surprisingly only sets in after about 24 hours and lasts up to 72 hours. This surprising chemical behavior, too, is not found with state of the art products or preparations.

Dosage in the Keeping Water

The dosage of the preparations according to the invention to the keeping water takes place depending on the present, damagingly acting concentration of total ammonia ($NH_3+NH_4^+$).

The following single doses of glyoxal.2NaHSO₃ proved successful, since they result in a significant reduction of the ammonia toxicity:
a) Total ammonia <5 mg/l
10-30 mg/l, preferably
15-20 mg/l of glyoxal.2NaHSO₃
b) Total ammonia 5-15 mg/l
20-60 mg/l, preferably
25-40 mg/l of glyoxal.2NaHSO₃
c) Total ammonia >15 mg/l
60-150 mg/l, preferably
120-140 mg/l of glyoxal.2NaHSO₃

The effective period is about 2-4 days. Especially effective in regards to a high prolongation of the $NH_3^-$-toxicity-lowering effect of up to 11-14 days, proved 3-4 single doses after respectively 3 days (or 72 hours).

The amount of the single dose (here in the example for glyoxal.2NaHSO₃) orientates by the prevailing concentration of total ammonia ($NH_3+NH_4^+$)
a) Total ammonia <5 mg/l
Every 3 days,
10-30 mg/l, preferably
15-20 mg/l of glyoxal.2NaHSO₃ are dosed.
b) Total ammonia 5-15 mg/l
Every 3 days,
20-60 mg/l, preferably
30-40 mg/l of glyoxal.2NaHSO₃ are dosed.
c) Total ammonia >15 mg/l
Every 3 days,
40-100 mg/l, preferably
60-80 mg/l of glyoxal.2NaHSO₃ are dosed.

The dosage was described for the preferred active agent glyoxal.2NaHSO₃.

In the subsequent table, the recommended dosages for the other NaHSO₃ adducts according to the invention of the aldehydes described under 3.1 are listed in relation to the total ammonia concentration. Since an essential structural element of the active agents according to the invention represents the adduct of NaHSO₃ to an aldehyde function, the application concentrations are derived from the values for glyoxal.2NaHSO₃ considering the molecular weights and the number of the sulfonate groups per molecule.

Dosage of the NaHSO₃ adducts
Dosage of the NaHSO₃ adducts of the aldehydes (mg/l)

| | Glutardialdehyde | Malondialdehyde | Succindialdehyde | Glycolaldehyde | Glycerinaldehyde | Glyoxylic acid |
|---|---|---|---|---|---|---|
| Single dose for total ammonia | | | | | | |
| <5 mg/l | 10-35 pref. 20-25 | 10-35 pref. 20-25 | 10-35 pref. 20-25 | 15-35 pref. 20-25 | 15-45 pref. 20-30 | 15-35 pref. 20-25 |

-continued

Dosage of the NaHSO₃ adducts
Dosage of the NaHSO₃ adducts of the aldehydes (mg/l)

|  | Glutardialdehyde | Malondialdehyde | Succindialdehyde | Glycolaldehyde | Glycerinaldehyde | Glyoxylic acid |
|---|---|---|---|---|---|---|
| 5-15 mg/l | 25-70 pref. 30-45 | 25-70 pref. 30-45 | 25-70 pref. 30-45 | 25-70 pref. 30-50 | 30-85 pref. 35-60 | 25-70 pref. 30-50 |
| >15 mg/l | 70-170 pref. 140-160 | 70-170 pref. 140-160 | 70-170 pref. 140-160 | 70-180 pref. 145-170 | 90-220 pref. 175-200 | 70-180 pref. 145-170 |
| 3-4 doses every 3 days for total ammonia | | | | | | |
| <5 mg/l | 10-35 pref. 15-25 | 10-35 pref. 15-25 | 10-35 pref. 15-25 | 10-35 pref. 20-25 | 15-45 pref. 20-30 | 10-35 pref. 20-25 |
| 5-15 mg/l | 25-70 pref. 35-45 | 25-70 pref. 35-45 | 25-70 pref. 35-45 | 25-70 pref. 35-50 | 30-90 pref. 45-60 | 25-70 pref. 35-50 |
| >15 mg/l | 45-115 pref. 70-90 | 45-115 pref. 70-90 | 45-115 pref. 70-90 | 50-120 pref. 70-95 | 60-150 pref. 90-120 | 50-120 pref. 70-100 |

Practical Application of the Preparations According to the Invention

The dosages for glyoxal.2NaHSO₃ and the other NaHSO₃ adducts according to the invention of the defined aldehydes in relation to the concentration of total ammonia present in the keeping water were predetermined for two application modes,
the single dose,
the 3-4-times repeated dose.

If the preparations with the doses stated above are added to keeping water (aquarium, ornamental pond, aquaculture system) with ammonia problems, the damaging and toxic effect of ammonia, $NH_3$, to fish and other water organisms is neutralized to a large extent.

The application is supported and facilitated by the good water solubility of the NaHSO₃ adducts of the defined aldehydes.

The aldehyde-NaHSO₃ adducts stated can be added to the keeping water
in a dissolved form in a product solution,
in a solid form as a powder, tablet, pellet, granulate,
as a suspension.

Beside the application in aquariums, garden ponds/ornamental ponds, aquaculture systems, the application in fish transport containers may be considered as well, since especially during the transport, the ammonia concentration in the transport water may increase strongly. The ammonia problems here are of special seriousness, since the density of fish (mass of fish per liter) is extremely high and the fish transported excrete higher amounts of ammonia, possibly also caused by stress.

EXAMPLE 1

Ammonia detoxifier for aquariums
Dosage: 100 ml per 200 l
For total ammonia concentrations of
<5 mg/l
Formulation components:
 buffer
 glyoxal.2NaHSO₃: 40.0 g/l

EXAMPLE 2

Ammonia detoxifier for aquariums
Dosage: 100 ml per 378.5 l
For total ammonia concentrations of
<5 mg/l
Formulation components:
 buffer
 suspension stabilizer
 glyoxal.2NaHSO₃: 66.0 g/l
(not completely dissolved, suspension)

EXAMPLE 3

Ammonia detoxifier for aquariums
Dosage: 100 ml per 757 l
For total ammonia concentrations of
5-15 mg/l
Formulation components:
 buffer
 suspension stabilizer
 glyoxal.2NaHSO₃: 265 g/l
(the largest part is present undissolved in a suspended form)

EXAMPLE 4

Ammonia detoxifier for garden ponds
Dosage: 500 g for 25,000 l
For total ammonia concentrations of
<5 mg/l
Dose: glyoxal.2NaHSO₃: 20.0 mg/l
Formulation components:
 powdery pure substance
 (glyoxal.2NaHSO₃): 500 g in a wide-mouth bottle, with dosage aid (sealing cap, measuring spoon)

EXAMPLE 5

Ammonia detoxifier for fish transport water
Product unit: 100 ml for 50 l of transport water
For total ammonia concentrations of
>15 mg/l
Dose: glyoxal.2NaHSO₃: 130 mg/l Formulation components:
 buffer
 suspension stabilizer
 glyoxal.2NaHSO$_3$: 65 g/l
 (not completely dissolved, suspension)

In the examples 1-4, glyoxal.2NaHSO$_3$ was used as the sole active agent.

Glyoxal-2NaHSO$_3$ may of course be replaced with the other aldehyde-NaHSO$_3$ adducts according to the invention, observing the respectively suitable application concentrations.

It is furthermore possible to use the aldehyde-NaHSO$_3$ adducts in any combination of 2, 3 or more compounds. Their percentages in the mixture and the consideration of the application concentrations together result in the amounts to be combined for the ammonia-oriented application purpose.

Beyond the formulation components listed in examples 1-4, the liquid and solid preparations may contain further adjuvants, like for example:
 excess of NaHSO$_3$ or aldehyde
 hydrocolloids
 complexing agents
 vitamins
 colorants
 galenic adjuvants
 diluents/extenders.

The present invention describes novel preparations or methods not yet used in aquaristics and aquaculture for keeping water for a significant reduction of the acute toxicity of ammonia to fish and other water organisms. The following compounds known in the art, partially from other fields of application, are preferably used as ammoniadetoxifying substances, either alone or in combination:

NaHSO$_3$ bisadducts of aliphatic dialdehydes: glyoxal, glutardialdehyde, malondialdehyde, succindialdehyde; NaHSO$_3$ monoadducts of aliphatic aldehydes: glycolaldehyde, glycerinaldehyde, glyoxylic acid.

The NaHSO$_3$ adducts according to the invention significantly reduce the acute fish toxicity of ammonia, when added to the keeping water in the defined application concentrations or ranges.

The dosages depend on the concentration of total ammonia and on the application mode single/one-time dose or repeated single dose every 3 days. All aldehyde-NaHSO$_3$ adducts according to the invention can be administered alone or in any combination in a liquid or solid form of administration.

The invention claimed:

1. A method of lowering the damaging effect of ammonia to water organisms, comprising:
 adding to water comprising the water organisms a composition comprising an adduct of sodium hydrogen sulfite (NaHSO$_3$) and of an aliphatic aldehyde of the formula (I) or of formula (II)

$$X-(CH_2)n\text{-}CO-H \quad (I)$$

$$HO-CH_2-CH(OH)-CO-H \quad (II),$$

wherein for formula (I)
n means the numbers 0 to 3, and
X means an —OH, —COOH, or —CO—H group,
wherein X cannot be —OH, if n=0.

2. The method according to claim 1, wherein the aliphatic aldehyde is glyoxal or glutardialdehyde.

3. The method according to claim 1, wherein the aliphatic aldehyde is malondialdehyde, succindialdehyde, glycolaldehyde, glycerinaldehyde, or glyoxylic acid.

4. The method according to claim 1, wherein the concentration of said adduct in the water ranges from 10 to 140 mg/l.

5. The method according to claim 1, wherein the concentration of said adduct in the water ranges from 10 to 50 mg/l.

6. The method according to claim 5, wherein the pH value of the water ranges from 3 to 8.

7. The method according to claim 1, wherein the composition further comprises 5 to 10 mol % of NaHSO$_3$ relative to said adduct $_4$.

8. A method of lowering the damaging effect of ammonia to water organisms, comprising:
 adding to water comprising the water organisms a composition comprising an adduct of sodium hydrogen sulfite (NaHSO$_3$) and of an aliphatic aldehyde, wherein the aliphatic aldehyde is glyoxal, glutardialdehyde, malondialdehyde, succindialdehyde, glycolaldehyde, glycerinaldehyde, or glyoxylic acid.

9. The method according to claim 8, wherein the aliphatic aldehyde is glyoxal or glutardialdehyde.

10. The method according to claim 8, wherein the aliphatic aldehyde is glyoxal.

11. The method according to claim 8, wherein the aliphatic aldehyde is glutardialdehyde.

12. The method according to claim 8, wherein the aliphatic aldehyde is malondialdehyde, succindialdehyde, glycolaldehyde, glycerinaldehyde, or glyoxylic acid.

13. The method according to claim 8, wherein the concentration of said adduct in the water ranges from 10 to 140 mg/l.

14. The method according to claim 8, wherein the concentration of said adduct in the water ranges from 10 to 50 mg/l.

15. The method according to claim 14, wherein the pH value of the water ranges from 3 to 8.

16. The method according to claim 8, wherein the composition further comprises 5 to 10 mol % of NaHSO$_3$ relative to said adduct.

17. The method according to claim 10, wherein the concentration of said adduct in the water ranges from 10 to 50 mg/l.

18. The method according to claim 17, wherein the pH value of the water ranges from 3 to 8.

19. The method according to claim 10, wherein the composition further comprises 5 to 10 mol % of NaHSO$_3$ relative to said adduct.

* * * * *